Dec. 8, 1931.　　　D. B. WESTIN　　　1,835,579
APPARATUS FOR HANDLING GLASSWARE
Filed June 22, 1926　　2 Sheets-Sheet 1
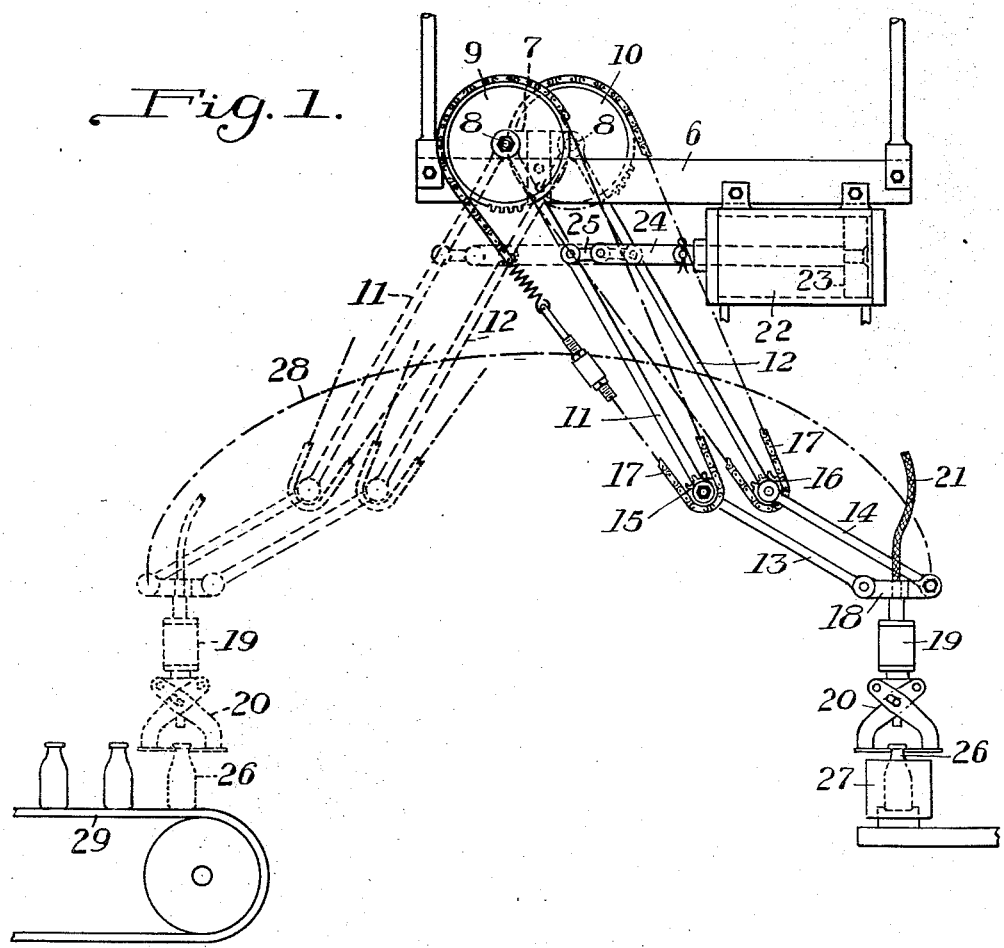
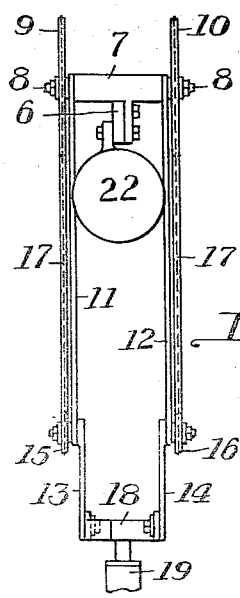
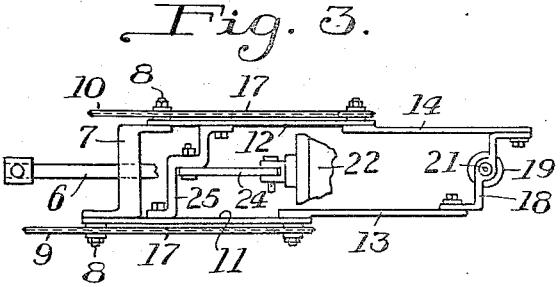
INVENTOR
DANIEL B. WESTIN
BY Robert D Brown
Attorney

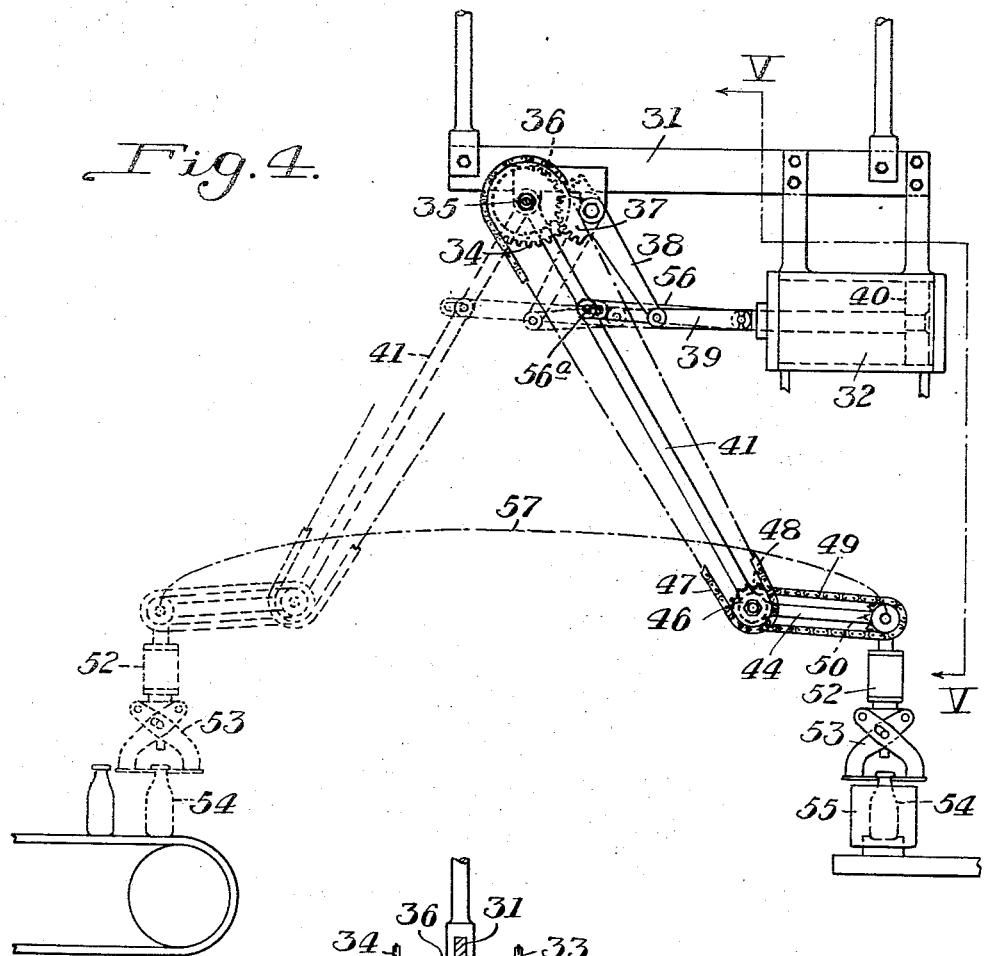
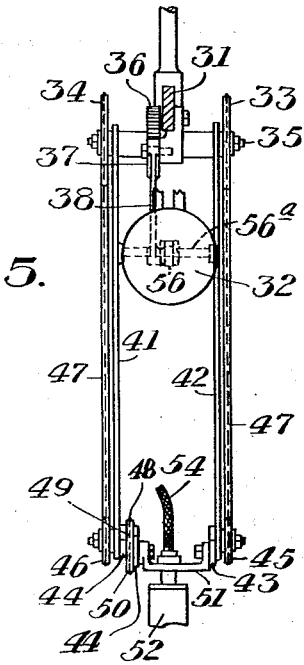

Patented Dec. 8, 1931

1,835,579

UNITED STATES PATENT OFFICE

DANIEL B. WESTIN, OF HARTFORD, CONNECTICUT, ASSIGNOR TO HARTFORD-EMPIRE COMPANY, OF HARTFORD, CONNECTICUT, A CORPORATION OF DELAWARE

APPARATUS FOR HANDLING GLASSWARE

Application filed June 22, 1926. Serial No. 117,744.

My invention relates to apparatus for handling glassware and other articles. It is especially useful for employment as a take-out device for removing glassware from forming molds to a conveyor, but is also suitable for employment in various other relations.

One object of my invention is to provide an improved form of handling mechanism for transferring glass articles, in an upright position, from a mold to a conveyor or other receiving surface.

Another object of my invention is to provide means for transferring bottles or the like through vertical and horizontal paths without danger of tipping them over at the picking-up and delivering stations.

Still another object of my invention is to provide an improved and simplified means for handling and transferring articles of various kinds.

The apparatus comprises means for lifting a bottle or similar article from a mold or other support by a pair of tongs and then carrying the article to a conveyor. When the tongs have released the article, they are moved vertically to clear it and are then returned to a position for transferring another article.

This application discloses apparatus which is somewhat similar to that shown and described in my copending application, Serial No. 117,745, filed on the same date as the present application.

Some of the forms which my invention may take are shown in the accompanying drawings, wherein Figure 1 is a side elevational view of apparatus embodying my invention; Fig. 2 is an end elevational view of a portion of the apparatus of Fig. 1; Fig. 3 is a plan view of a portion of the apparatus of Fig. 1; Fig. 4 is a side elevational view of a modified form of apparatus, and Fig. 5 is an end elevational view of the apparatus of Fig. 4, with parts in section, on the line 5—5 of Fig. 4.

Referring now to Figs. 1 to 3, I show a supporting bar 6 upon which a bracket 7 having offset shaft-like extensions 8 is supported. Sprocket wheels 9 and 10 are non-rotatably mounted upon the extensions 8, and the extensions 8 pivotally support the upper ends of a pair of arms 11 and 12. The lower ends of the arms 11 and 12 are pivotally connected to a pair of arms 13 and 14, respectively. Sprocket wheels 15 and 16 are rigidly connected to the arms 13 and 14 respectively, and a sprocket chain 17 extends around each pair of sprockets 9—15 and 10—16.

The arms 11 and 12 are of the same length, but their points of pivotal support are spaced longitudinally of the bar 6. The arms 13 and 14 are also of equal length, so that their forward ends are offset in a direction parallel to the arms. The outer or lower ends of the arms 13 and 14 are pivotally connected to a cross bar 18 whose ends are offset to bring them opposite the offset ends of the arms 13 and 14. The bar 18 serves as a support for a cylinder 19 and a pair of ware-engaging tongs 20. Fluid pressure is admitted through a flexible pipe 21 to effect opening and closing movements of the tongs, by means of a piston (not shown) in any manner well known in the art.

A cylinder 22 is secured to the bar 6 and is provided with a piston 23 to which a link 24 is connected at one end. The opposite end of the link 24 is connected to a cross bar whose ends have pivotal connection with the arms 11 and 12.

Assuming fluid pressure to have been admitted to the cylinder 19 for the purpose of closing the tongs about the neck of a bottle 26 to remove it from a mold 27, fluid pressure is admitted to the right hand end of the cylinder 22 to move the piston 23 to the left, and the arms 11 and 12 will be moved in a clockwise direction to the positions indicated in dotted lines in Fig. 1. Coincident with this movement, the arms 13 and 14 are swung about their pivots, in a counter-clockwise direction, lifting the tongs 20 in a generally vertical direction and swinging them between the arms 11 and 12, through a path following approximately the dotted line 28. This pivotal movement of the arms 13 and 14 is brought about by reason of the fact that the sprockets 9 and 10 are non-rotatable, consequently causing the sprocket chains 17 to impart rotative movement to the sprockets 15 and 16 and effect a crank-like movement of the arms 13 and 14 about their pivots.

The cross bar 18 is pivotally connected to the arms 13 and 14 on offset axes, as shown more clearly in Fig. 3, so that the bar is held against rotative movement and the tongs and bottle are suspended in a vertical position. When the tongs 20 have reached the position indicated in dotted lines in Fig. 1, air is admitted to the cylinder 19 to effect a spreading movement of the tongs while the bottle is being deposited upon a conveyer 29 that may lead to a lehr or other receptacle. Air is then admitted to the left hand end of the cylinder 23 for returning the tongs through the path 28 to ware-receiving position. The offset pivotal supports for the cross bar 18 prevent idle swinging movement of the tongs while the bottle is being transported.

Referring now to Figs. 4 and 5, I show a modified form of apparatus wherein provision is made for effecting a greater range of vertical movement of the tongs, preliminary to imparting lateral traveling movement thereto. In this form of apparatus, a bar 31 supports a cylinder 32 and a pair of sprockets 33 and 34. The sprockets 33 and 34 are secured to a shaft 35 that carries a gear wheel 36 which meshes with a segmental gear member 37. The gear member 37 has an arm 38 that is pivotally connected to a link 39 which is in turn connected to a piston 40, so that as the piston is reciprocated, the sprockets 33 and 34 will be oscillated.

A pair of arms 41 and 42 are pivotally connected at their upper ends to the shaft 35 and at their lower ends have pivotal connection with a pair of arms 43 and 44, respectively. Sprocket wheels 45 and 46 are rigidly connected to the arms 43 and 44 and chains 47 pass around the pairs of sprocket wheels 33—45 and 34—46.

A sprocket wheel 48 is rigidly connected to the arm 41 and a chain 49 passes around said sprocket and a sprocket 50 that is secured to a cross bar 51 which is pivotally connected to the outer ends of the arms 43 and 44.

The bar 51 supports a cylinder 52 and a pair of tongs 53. Fluid pressure is admitted through a flexible connection 54 to actuate a piston (not shown), to open and close the tongs 53. After fluid pressure has been admitted to the cylinder 52 to cause the tongs 53 to grasp the neck of a bottle 54 for the purpose of removing the same from a mold 55, fluid pressure is admitted to the right hand side of the piston 40, and the link 39 is thereby moved to the left, to effect rotative movement of the sprocket wheels 33 and 34 in a counter-clockwise direction. Such movement is transmitted to the sprocket wheels 45 and 46 which are rigidly secured to the arms 43 and 44, thus causing the outer ends of said arms and the tongs 53 to be elevated a short distance.

A link 56 which has pin-and-slot connection with a cross-bar 56ª, whose ends are secured to the arms 41 and 42, is also connected to the piston 40, so that the arms 41 and 42 will be moved in a clockwise direction after the sprocket wheels 33 and 34 have been moved a slight distance in a counter-clockwise direction by the segmental gear 37. During movement of the arms 41 and 42, the sprocket wheels 45 and 46 will roll in the chains 47 and the outer ends of the arms 43 and 44 and the tongs 53 will be carried through a path having the general contour of the dotted line 57. Since the arms 43—44 do not have rotative movement relative to the sprocket wheel 46 and the sprocket wheels 48 and 50 are of suitable size, the chain 49 will impart rotative movement to the sprocket wheel 50 in a clockwise direction an amount compensating for the degree of rotative movement of the arms 43 and 44 about their pivotal supports, and the degree of rotative movement of the arm 41 about its pivot 35, so as to maintain the cylinder 52 and the tongs 53 in a vertical position and preventing idle swinging movements thereof.

When the tongs 53 have been moved to the position indicated in dotted lines, fluid pressure is admitted to the cylinder 52 to cause the tongs to release the bottle. At this time the piston 40 has reached the left hand end of its cylinder 32 and fluid pressure is admitted to effect return movement thereof. At the beginning of the return movement of the piston, the segmental gear 37 is rocked in a counter-clockwise direction preliminary to the taking up of the lost motion between the link 56 and the arms 41 and 42 so that the tongs are elevated slightly, as when removing the bottle from the mold 55, to clear the bottle before beginning their return travel to the mold table.

At the completion of this vertical movement, the link 56 is further retracted by the piston 40, to swing the arms 41 and 42 from the position indicated in dotted lines to that indicated in full lines, the bar 51 and cylinder 52 being thereby swung between the arms 41 and 42, through the path 57 and into position to remove another bottle from the mold 55.

The details of construction shown herein may be variously modified within the scope of the appended claims.

I claim as my invention:

1. Apparatus for handling ware, comprising a transfer device, a ware-engaging member movably carried by said device, means for oscillating said transfer device between ware-receiving and ware-discharging stations, and means including a lost motion connection interposed between the first named means and said device for effecting movement of said member relative to said device preliminary to movement of the device from the ware-receiving station, said device and said member being thereafter simultaneously and positively moved throughout the remainder of their paths of movement, both said means being positively operated by a single source of mechanical power.

2. Apparatus for handling ware, comprising an arm pivotally supported at its inner end, a second arm pivotally connected at one end to the outer end of the first named arm, a ware-supporting device pivotally connected to the outer end of the second named arm, means for oscillating the first named arm about its pivot and for simultaneously swinging the second named arm about its point of pivotal support, and means for effecting pivotal movement of said device relative to the second named arm, in predetermined relation to pivotal movement of said arm.

3. Apparatus for handling ware, comprising a pair of arms disposed in laterally spaced relation and pivotally mounted at their inner ends, a second pair of arms having their inner ends pivotally supported between the outer ends of the first named arms, a ware-supporting device pivotally mounted between the outer ends of the second named arms, means for oscillating the first named arms about their pivots, and means for simultaneously oscillating the second named arms about their pivots and causing their outer ends to pass between the first named arms.

4. Apparatus for handling ware, comprising a pair of arms disposed in laterally spaced relation, and pivotally mounted at their inner ends, a second pair of arms having their inner ends pivotally supported between the outer ends of the first named arms, a ware-supporting device pivotally mounted between the outer ends of the second named arms, means for oscillating the first named arms about their pivots, means for simultaneously oscillating the second named arms about their pivots and causing their outer ends to pass between the first named arms, and means for rotating the ware-supporting device about its pivot in predetermined relation to movements of the arms by which it is supported.

5. Apparatus for handling ware, comprising an arm pivotally supported at its inner end, a sprocket member mounted adjacent to said end, a sprocket wheel rotatably supported on the outer end of said arm, a second arm rigidly connected to said sprocket wheel, a chain extending around said sprocket member and sprocket wheel, a ware-supporting device on the outer end of the second named arm, a link having lost motion connection with said arm, and a positive connection between said link and the first named sprocket, whereby upon actuation of the link the first named sprocket will be rotated slightly previous to the taking up of said lost motion connection and movement of the first named arm.

6. Apparatus for handling ware, comprising an arm pivotally supported at its inner end, a sprocket member mounted adjacent to said end, a sprocket wheel rotatably supported on the outer end of said arm, a second arm rigidly connected to said sprocket wheel, a chain extending around said sprockets, a ware-supporting device on the outer end of the second named arm, a link having lost motion connection with said arm, a positive connection between said link and the first named sprocket, whereby upon actuation of the link the first named sprocket will be rotated slightly previous to the taking up of said lost motion connection and movement of the first named arm, a sprocket wheel fixed to said first named arm, and a connection between the last named sprocket and said ware-supporting device, for effecting pivotal movement of said device in its supporting arm during pivotal movement of the arms.

7. Apparatus for handling ware, comprising a pair of arms disposed in laterally spaced relation and pivotally supported at their inner ends, a second pair of arms pivotally supported between the outer ends of the first named arms, a ware-supporting device pivotally connected to the outer ends of the second named arms, means for moving the first named arms about their pivots, means for simultaneously moving the second named arms about their pivots, and means for effecting pivotal movement of said ware-supporting device in synchronism with pivotal movement of its supporting arms.

8. Apparatus for handling ware, comprising a pair of arms disposed in laterally spaced relation and pivotally supported at their inner ends, a second pair of arms pivotally supported between the outer ends of the first named arms, a ware supporting device pivotally connected to the outer ends of the second named arms, means for moving the first named arms about their pivots, means for simultaneously moving the second named arms about their pivots, and means for effecting pivotal movement of said ware-supporting device in predetermined relation to pivotal movement of its supporting arms, the apparatus being arranged to effect oscillatory movement of the ware-supporting device between ware-receiving and ware-delivering stations located in substantially a common plane.

9. Apparatus for handling ware, comprising a pivotally mounted arm, a second arm pivotally connected to the first named arm and means for first swinging the said second arm on its pivot and then swinging both arms simultaneously on their respective pivots.

10. Apparatus for handling ware, comprising a pivotally mounted arm, a second arm pivotally connected to the first named arm and means for first swinging the said second arm on its pivot and then swinging both arms simultaneously on their respective pivots, the said means comprising a movable member having a positive connection to the second named arm and a lost motion connection with the first named arm.

Signed at Hartford, Conn., this 21st day of June, 1926.

DANIEL B. WESTIN.